(12) United States Patent
Huang et al.

(10) Patent No.: US 11,665,418 B2
(45) Date of Patent: May 30, 2023

(54) CAMERA MODULE AND ELECTRONIC DEVICE HAVING THE CAMERA MODULE

(71) Applicant: TRIPLE WIN TECHNOLOGY(SHENZHEN) CO. LTD., Shenzhen (CN)

(72) Inventors: Ding-Nan Huang, New Taipei (TW); Kun Li, Guangdong (CN); Yu-Shuai Li, Shenzhen (CN); Rui Zhang, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 11 days.

(21) Appl. No.: 17/535,941

(22) Filed: Nov. 26, 2021

(65) Prior Publication Data
US 2023/0031242 A1 Feb. 2, 2023

(30) Foreign Application Priority Data

Jul. 27, 2021 (CN) .......................... 202110852874.X (51) Int. Cl.
*H04N 23/55* (2023.01)
*H04N 23/54* (2023.01)
*H04N 23/57* (2023.01)

(52) U.S. Cl.
CPC ............. *H04N 23/55* (2023.01); *H04N 23/54* (2023.01); *H04N 23/57* (2023.01)

(58) Field of Classification Search
CPC ........ H04N 23/52; H04N 23/51; H04N 23/57; H04N 23/55; H04N 23/54
See application file for complete search history.

(56) References Cited

U.S. PATENT DOCUMENTS

| 7,515,202 B2* | 4/2009 | Saito ...................... G02B 7/022 |
| | | 348/374 |
| 10,666,843 B2* | 5/2020 | Li .......................... H04N 23/54 |
| 11,116,050 B1* | 9/2021 | Bhogal .................... H05B 6/68 |
| 2007/0030334 A1* | 2/2007 | Nishizawa ............. H04N 23/55 |
| | | 347/245 |

(Continued)

FOREIGN PATENT DOCUMENTS

| TW | M362434 U1 | 8/2009 |
| TW | 202033986 A | 9/2020 |
| TW | 202041951 A | 11/2020 |

*Primary Examiner* — Chiawei Chen
(74) *Attorney, Agent, or Firm* — ScienBiziP, P.C.

(57) ABSTRACT

A camera module includes a mounting frame defining a first through hole, a filter installed in the first through hole, and a circuit board including a first surface and a second surface. The mounting frame is on the first surface. An air escaping channel is recessed from the second surface, an air escaping hole penetrates the first surface and the second surface and communicates with the air escaping channel. The circuit board, the mounting frame, and the filter cooperate with each other to form a first cavity, the first cavity communicates with the air escaping hole. The air escaping channel includes a first channel portion and a second channel portion, an angle is formed between the first channel portion and the second channel portion. The air escaping hole communicates with the first channel portion, the second channel portion extends to an edge of the circuit board to form an opening.

18 Claims, 6 Drawing Sheets

(56) References Cited

U.S. PATENT DOCUMENTS

| | | | | |
|---|---|---|---|---|
| 2008/0079846 A1* | 4/2008 | Ikari | ............. | H04N 23/57 |
| | | | | 348/E5.026 |
| 2012/0229701 A1* | 9/2012 | Pavithran | ............. | H04N 23/57 |
| | | | | 348/374 |
| 2020/0409016 A1* | 12/2020 | Jiang | ............. | G02B 7/003 |
| 2021/0080809 A1* | 3/2021 | Stern | ............. | G03B 17/12 |
| 2021/0368593 A1* | 11/2021 | Bhogal | ............. | H04N 23/51 |

\* cited by examiner

CAMERA MODULE AND ELECTRONIC DEVICE HAVING THE CAMERA MODULE

FIELD

The subject matter herein generally relates to a camera module and an electronic device having the camera module.

BACKGROUND

Electronic products (such as mobile phones or tablet computers, etc.) usually contain cameras. The camera includes a lens, a lens holder, a mounting frame, a filter, a photosensitive chip, and a circuit board. The filter, the mounting frame and the circuit board are airtightly packaged, which can prevent external water and impurities from entering the inside of the camera and avoid affecting the service life of the internal components of the camera. However, electronic devices need to be vacuumed for reliability testing after they are manufactured and before they are put on the market. In a vacuum environment, due to the airtight packaging between the filter and the circuit board, there is a vacuum between the inside of the camera and the outside world. The pressure difference increases the force on the filter, which makes the filter risky.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 1:
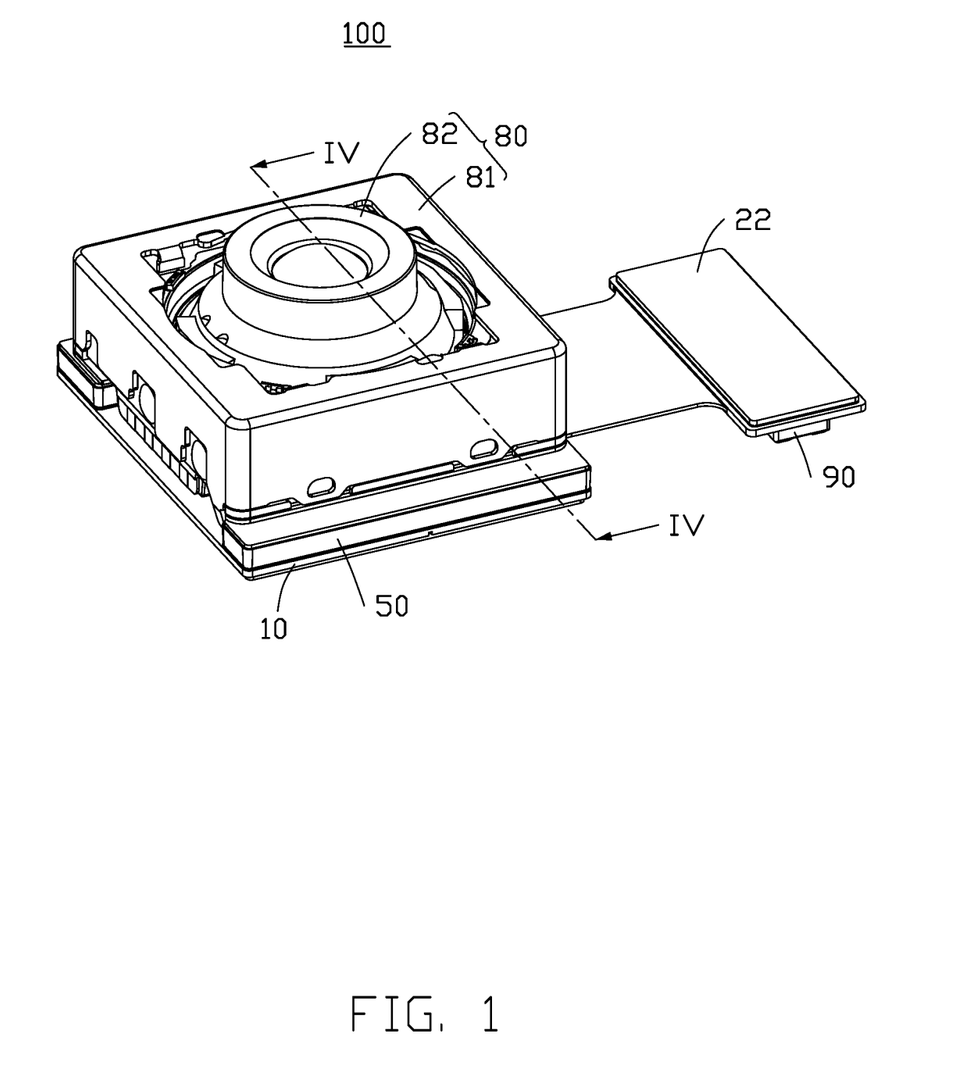
FIG. 1 is a diagram of an embodiment of a camera module according to the present disclosure.
Figure 2:
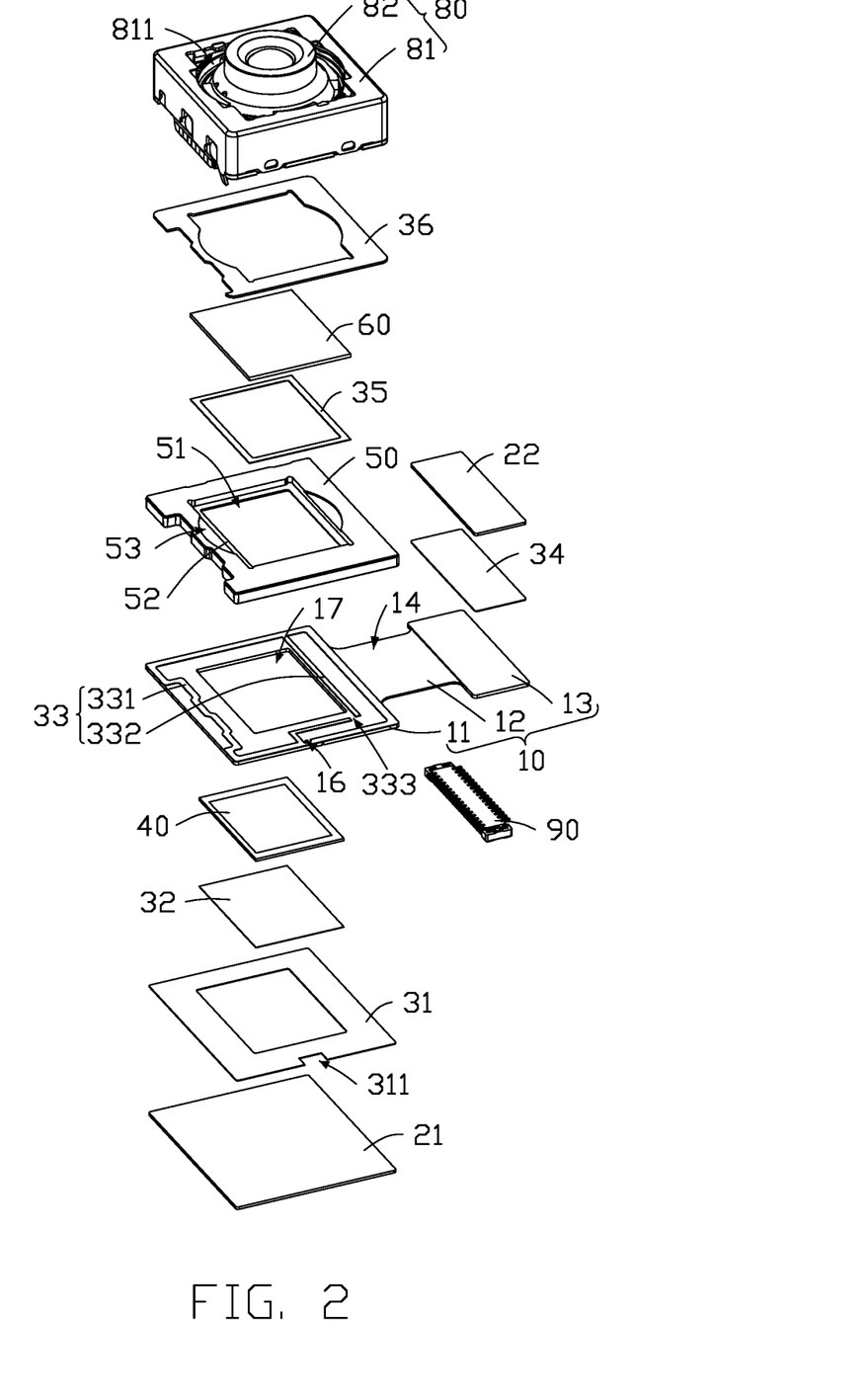
FIG. 2 is an exploded, diagrammatic view of an embodiment of a camera module according to the present disclosure.
Figure 3:
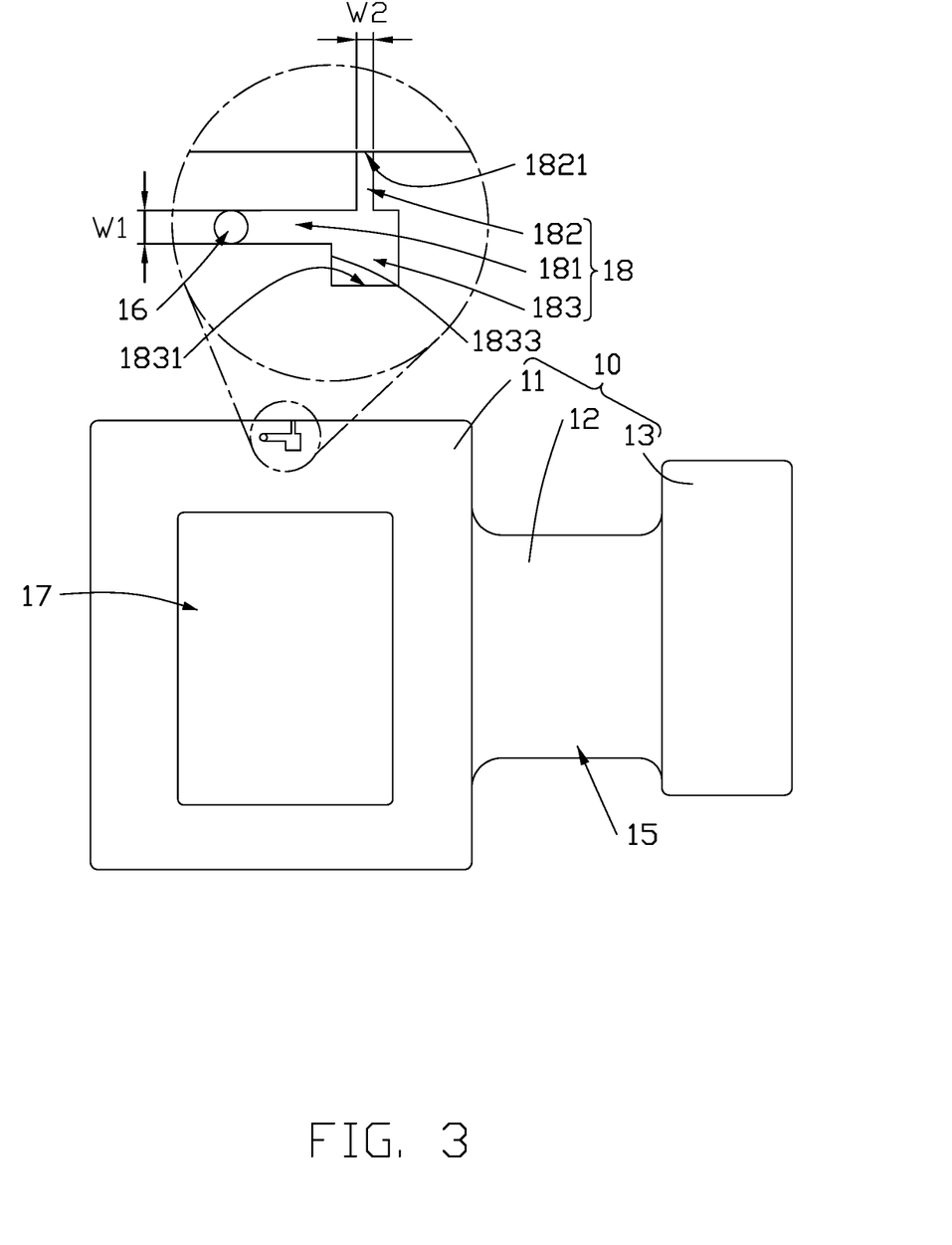
FIG. 3 is a diagram of an embodiment of a circuit board according to the present disclosure.

FIG. 1 illustrates an embodiment of a camera module 100. Referring to FIGS. 1, 2 and 3, the camera module 100 includes a first reinforcing plate 21, a circuit board 10, a photosensitive chip 40, a mounting frame 50, a filter 60, and a lens assembly 80. The circuit board 10 includes a first surface 14 and a second surface 15 facing away from the first surface 14. The first reinforcing plate 21 is arranged on the second surface 15 of the circuit board 10. The mounting frame 50 is arranged on the first surface 14 of the circuit board 10. In at least one embodiment, the mounting frame 50 may be roughly square. The mounting frame 50 includes a first through hole 51 and a protruding portion 52. The protruding portion 52 protrudes from an inner wall 510 defining the first through hole 51 to a center axis of the first through hole 51. The filter 60 is arranged on the protruding portion 52. The lens assembly 80 is arranged on the mounting frame 50.

Referring to FIGS. 2 and 3, the circuit board 10 includes a first portion 11, a second portion 12 and a third portion 13 connected in that sequence. The mounting frame 50 and the first reinforcing plate 21 are respectively located opposite sides of the first portion 11. The circuit board 10 may be a flexible circuit board, a rigid circuit board, or a flexible-rigid circuit board. In at least one embodiment, the circuit board 10 is a flexible-rigid circuit board, that is, the first portion 11 and the third portion 13 are rigid portions of the circuit board 10, and the second portion 12 are a flexible portion of the circuit board 10. An electrical connecting portion 90 is mounted on the second surface 15. The electrical connecting portion 90 may be a connector or golden finger to realize signal transmission between the camera module 100 and other electronic components (not shown).

Figure 4:
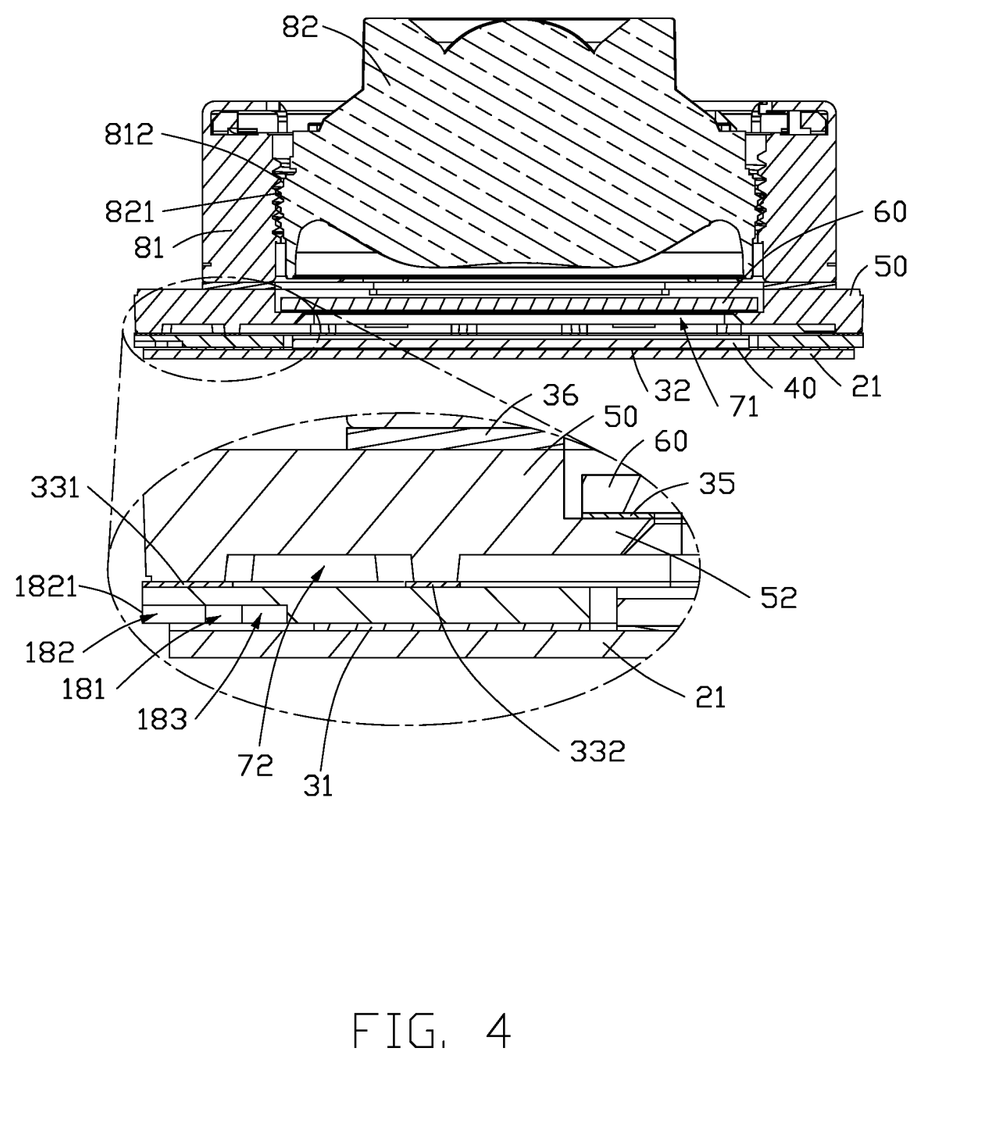
FIG. 4 is a cross-sectional view of an embodiment of the camera module taken along IV-IV line of FIG. 1.

Referring to FIGS. 2, 3, and 4, a second through hole 17 is defined to penetrate an area of the first surface 14 corresponding the first portion 11 and an area of the second surface 15 corresponding the first portion 11 along a thickness direction. The photosensitive chip 40 is received in the second through hole 17 and arranged on the first reinforcing plate 21. The first portion 11, the first reinforcing plate 21, the mounting frame 50, and the filter 60 cooperate with each other to form a sealed first cavity 71.

Referring to FIGS. 2, 3, and 4, an air escaping hole 16 penetrates the first portion 11 along the thickness direction and communicates with the first cavity 71. An air escaping channel 18 is recessed from the area of the second surface 15 corresponding the first portion 11 toward the first surface 14, and the air escaping channel 18 communicates with the air escaping hole 16. The air escaping channel 18 includes a first channel portion 181, a second channel portion 182, and a third channel portion 183 connected between the first channel portion 181 and the second channel portion 182. The air escaping hole 16 may be located at an end of the first channel portion 181 away from the third channel portion 183. The second channel portion 182 extends to an edge of the first portion 11 to form an opening 1821 to communicate with the outside atmosphere. The first cavity 71 communicates with the outside atmosphere through the air escaping hole 16 and the air escaping channel 18. Even if the camera module 100 is placed in a vacuum environment, a pressure difference between the first cavity 71 and the vacuum environment will not be generated, thereby preventing the filter 60 from being damaged due to the pressure difference.

In at least one embodiment, an airflow direction of the first channel portion 181 and an airflow direction of the second channel portion 182 do not overlap, that is, an angle is formed between an extending direction of the first channel portion 181 and an extending direction of the second channel portion 182, thereby effectively preventing external impurities from entering into the first cavity 71 through the air escaping channel 18. As a result, an imaging effect of the camera module 100 is not affected.

Referring to FIGS. 2 and 3, in at least one embodiment, a width W2 of the second channel portion 182 may be less than a width W1 of the first channel portion 181, so as to further prevent the external impurities from entering the air escaping channel 18.

In at least one embodiment, an inner wall defining the third channel portion 183 includes an inner surface 1831 facing and away from the opening 1821. In order to further prevent the external impurities from entering the first cavity 71, the third channel portion 183 may include a recess 1833 corresponding to the inner surface 1831 compared to the first channel portion 181. As a result, some of the external impurities entering the third channel portion 183 can be contained in the recess 1833 and prevented from entering the first channel portion 181 through the third channel portion 183.

Figure 5:
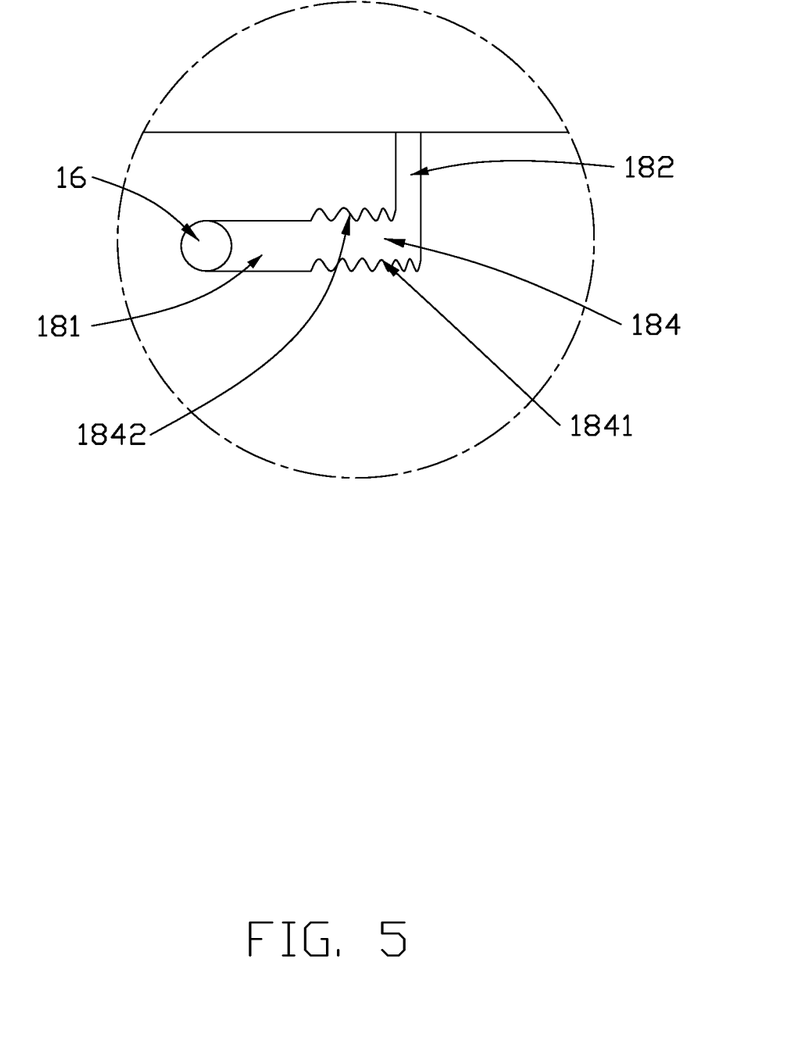
FIG. 5 is a diagram of an embodiment of an air escaping channel according to the present disclosure.

Referring to FIG. 5, in at least one embodiment, the inner wall defining the third channel portion 184 is wavy and includes a plurality of protrusions 1841. Some of the external impurities entering the second channel portion 182 is blocked by the plurality of protrusions 1841 distributed in a wave shape, thereby preventing the external impurities from entering the first channel portion 181. In at least one embodiment, the third channel portion 184 may have other shapes.

Referring to FIGS. 2 and 4, in at least one embodiment, the first reinforcing plate 21 and the first portion 11 may be bonded by a first adhesive layer 31. A portion of the first adhesive layer 31 corresponding to the air escaping channel 18 defines a first notch 311, so as to prevent the first adhesive layer 31 from blocking the air escaping channel 18. The first reinforcing plate 21 may be a metal steel product.

Referring to FIGS. 2 and 4, in at least one embodiment, the photosensitive chip 40 and the first reinforcing plate 21 may be bonded by a second adhesive layer 32.

In at least one embodiment, the mounting frame 50 and the first portion 11 may be bonded by a third adhesive layer 33. The third adhesive layer 33 includes a first adhesive portion 331 and a second adhesive portion 332. The first adhesive portion 331 is substantially ring-shaped to surround the second through hole 17, and is bonded to an outer edge of a bottom surface of the mounting frame 50. The air escaping hole 16 is located at a side of the first adhesive portion 331 close to the second through hole 17. Two ends of the second adhesive portion 332 are connected to the side of the first adhesive portion 331 close to the second through hole 17, and the second adhesive portion 332 is arranged close to the second through hole 17. The second adhesive portion 332 includes a second notch 333. The mounting frame 50, the first adhesive portion 331, the second adhesive portion 332, and the first portion 11 cooperate with each other to form a second cavity 72. The air escaping hole 16 communicates with the second cavity 72. The first cavity 71 and the second cavity 72 communicate with each other through the second notch 333.

Referring to FIG. 2, in at least one embodiment, a second reinforcing plate 22 may be arranged on an area of the first surface 14 corresponding to the third portion 13. The second reinforcing plate 22 may be bonded to the third portion 13 by a fourth adhesive layer 34.

Referring to FIG. 2, in at least one embodiment, the filter 60 may be bonded to the protruding portion 52 by a fifth adhesive layer 35.

Referring to FIGS. 2 and 4, the lens assembly 80 includes a lens 82 and a holder 81. The holder 81 includes an inner surface 810 to define a third through hole 811. An internal thread 812 is formed on the inner surface 810. A central axis of the third through hole 811 is collinear with a central axis of the first through hole 51. An external thread 821 is formed on an outer wall of the lens 82. The external thread 821 cooperates with the internal thread 812 to connect the lens 82 and the holder 81.

Referring to FIGS. 2 and 4, the mounting frame 50 may be bonded to the holder 81 by a sixth adhesive layer 36. Two grooves 53 is recessed from a top surface of the mounting frame 50 facing away from the circuit board 10 toward a bottom surface of the mounting frame 50 facing circuit board 10. The grooves 53 are located opposite sides of the first through hole 51, and each of the grooves 53 communicates with the first through hole 51. When the lens assembly 80 is mounted on the mounting frame 50, the grooves 53 can effectively prevent a bottom of the lens assembly 80 from abutting against the top surface of the mounting frame 50.

Figure 6:
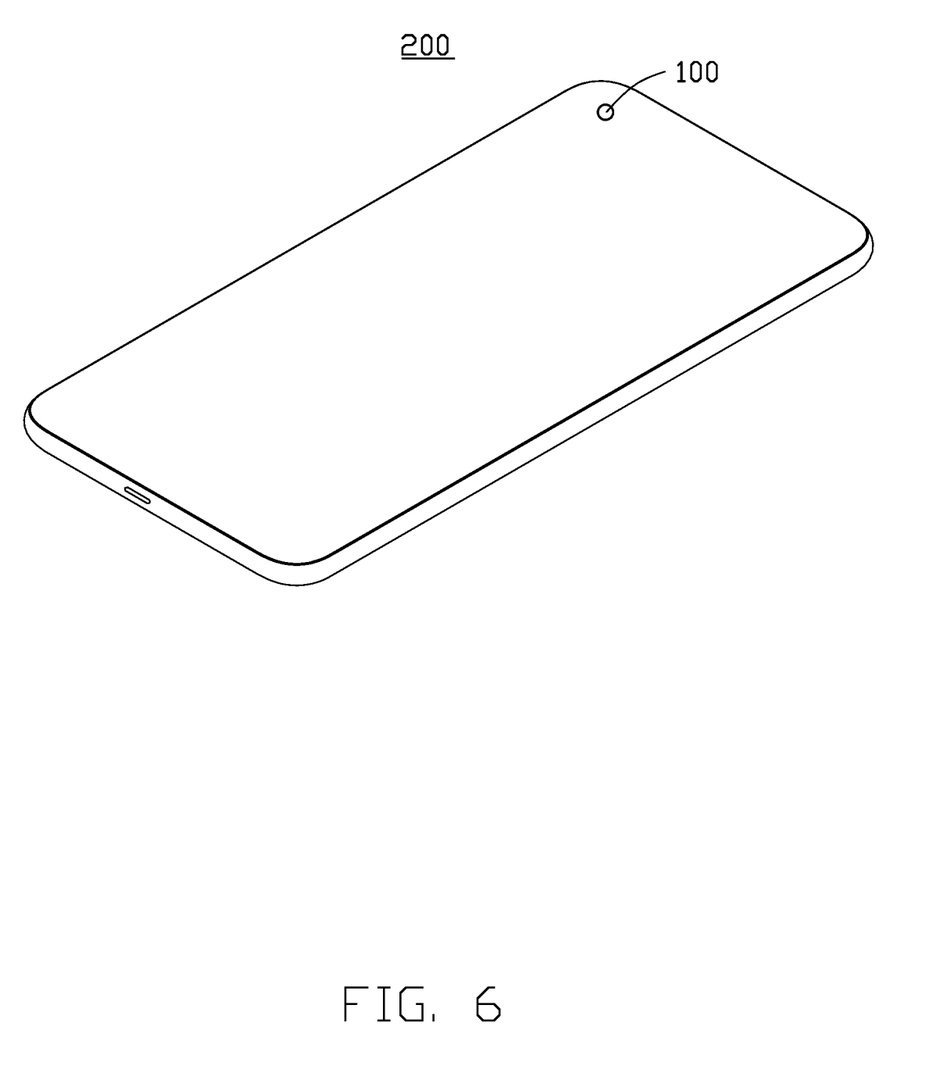
FIG. 6 is a diagram of an embodiment of an electronic device according to the present disclosure.

FIG. 6 illustrates an embodiment of an electronic device 200 including the above camera module 100. The electronic device 200 may be, but not limited to, a mobile phone, a wearable device, a vehicle, or a monitoring device.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A camera module comprising:
a mounting frame defining a first through hole;
a filter installed in the first through hole; and
a circuit board comprising a first surface and a second surface facing away from the first surface;
wherein the mounting frame is arranged on the first surface, an air escaping channel is recessed from the second surface toward the first surface, an air escaping hole penetrates the first surface and the second surface and communicates with the air escaping channel; the circuit board, the mounting frame, and the filter cooperate with each other to form a first cavity, the first cavity communicates with the air escaping hole; the air escaping channel comprises a first channel portion and a second channel portion communicating with the first channel portion, an angle is formed between an extending direction of the first channel portion and an extending direction of the second channel portion, the air escaping hole is located at an end of the first channel portion away from the second channel portion, the second channel portion extends to an edge of the circuit board to form an opening to communicate with outside atmosphere.

2. The camera module of claim 1, wherein a width of the second channel portion is less than a width of the first channel portion.

3. The camera module of claim 1, wherein the air escaping channel further comprises a third channel portion connected between the first channel portion and the second channel portion; compared to the first channel portion, the third channel portion comprises a recess extending away from the opening.

4. The camera module of claim 3, wherein an inner wall defining the third channel portion comprises a plurality of protrusions.

5. The camera module of claim 1, wherein the camera module further comprises a first reinforcing plate, the reinforcing plating is arranged o the second surface.

6. The camera module of claim 5, wherein the first reinforcing plate and the circuit board are bonded by a first adhesive layer, and a portion of the first adhesive layer corresponding to the air escaping channel defines a first notch.

7. The camera module of claim 5, wherein the camera module further comprises a photosensitive chip, the circuit board defines a second through hole, the photosensitive chip is received in the second through hole and arranged on the first reinforcing plate.

8. The camera module of claim 7, wherein a second adhesive layer is between the photosensitive chip and the first reinforcing plate.

9. The camera module of claim 7, wherein the camera module further comprises a third adhesive layer between the mounting frame and the circuit board, the third adhesive layer comprises a first adhesive portion and a second adhesive portion; the first adhesive portion is ring-shaped to surround the second through hole, the air escaping hole is located at a side of the first adhesive portion close to the second through hole; two ends of the second adhesive portion are connected to the side of the first adhesive portion close to the second through hole, and the second adhesive portion is arranged close to the second through hole; the second adhesive portion comprises a second notch; the mounting frame, the circuit board, the first adhesive portion, and the second adhesive portion cooperate with each other to form a second cavity, the first cavity and the second cavity communicate with each other through the second notch.

10. An electronic device comprising:
   a camera module comprising:
      a mounting frame defining a first through hole;
      a filter installed in the first through hole; and
      a circuit board comprising a first surface and a second surface facing away from the first surface;
      wherein the mounting frame is arranged on the first surface, an air escaping channel is recessed from the second surface toward the first surface, an air escaping hole penetrates the first surface and the second surface and communicates with the air escaping channel; the circuit board, the mounting frame, and the filter cooperate with each other to form a first cavity, the first cavity communicates with the air escaping hole; the air escaping channel comprises a first channel portion and a second channel portion communicating with the first channel portion, an angle is formed between an extending direction of the first channel portion and an extending direction of the second channel portion, the air escaping hole is located at an end of the first channel portion away from the second channel portion, the second channel portion extends to an edge of the circuit board to form an opening to communicate with outside atmosphere.

11. The electronic device of claim 10, wherein a width of the second channel portion is less than a width of the first channel portion.

12. The electronic device of claim 10, wherein the air escaping channel further comprises a third channel portion connected between the first channel portion and the second channel portion; compared to the first channel portion, the third channel portion comprises a recess extending away from the opening.

13. The electronic device of claim 12, wherein an inner wall defining the third channel portion comprises a plurality of protrusions.

14. The electronic device of claim 10, wherein the camera module further comprises a first reinforcing plate, the reinforcing plating is arranged o the second surface.

15. The electronic device of claim 14, wherein the first reinforcing plate and the circuit board are bonded by a first adhesive layer, and a portion of the first adhesive layer corresponding to the air escaping channel defines a first notch.

16. The electronic device of claim 14, wherein the camera module further comprises a photosensitive chip, the circuit board defines a second through hole, the photosensitive chip is received in the second through hole and arranged on the first reinforcing plate.

17. The electronic device of claim 16, wherein a second adhesive layer is between the photosensitive chip and the first reinforcing plate.

18. The electronic device of claim 16, wherein the camera module further comprises a third adhesive layer between the mounting frame and the circuit board, the third adhesive layer comprises a first adhesive portion and a second adhesive portion; the first adhesive portion is ring-shaped to surround the second through hole, the air escaping hole is located at a side of the first adhesive portion close to the second through hole; two ends of the second adhesive portion are connected to the side of the first adhesive portion close to the second through hole, and the second adhesive portion is arranged close to the second through hole; the second adhesive portion comprises a second notch; the mounting frame, the circuit board, the first adhesive portion, and the second adhesive portion cooperate with each other to form a second cavity, the first cavity and the second cavity communicate with each other through the second notch.

* * * * *